(12) United States Patent
Self et al.

(10) Patent No.: US 9,544,750 B1
(45) Date of Patent: Jan. 10, 2017

(54) CALLER LOCATION DETERMINATION SYSTEMS AND METHODS

(71) Applicant: Laaser Critical Communications Corp., Atlanta, GA (US)

(72) Inventors: Michael R. Self, Ft. Lauderdale, FL (US); Frederick L. White, Atlanta, GA (US)

(73) Assignee: LaaSer Critical Communications Corp., Atlanta, GA (US)

( * ) Notice: Subject to any disclaimer, the term of this patent is extended or adjusted under 35 U.S.C. 154(b) by 0 days.

(21) Appl. No.: 15/218,973

(22) Filed: Jul. 25, 2016

Related U.S. Application Data

(63) Continuation-in-part of application No. 14/939,702, filed on Nov. 12, 2015, now Pat. No. 9,402,159.

(51) Int. Cl.
*H04W 4/22* (2009.01)
*H04W 4/02* (2009.01)
*H04M 3/42* (2006.01)

(52) U.S. Cl.
CPC .......... *H04W 4/22* (2013.01); *H04M 3/42357* (2013.01); *H04W 4/02* (2013.01); *H04W 4/023* (2013.01)

(58) Field of Classification Search
CPC ............................... H04W 4/023; H04W 4/22
USPC ........... 455/404.1-2, 412.1-2, 456.1-2, 567; 379/45
See application file for complete search history.

(56) References Cited

U.S. PATENT DOCUMENTS

| | | | |
|---|---|---|---|
| 8,064,875 B2* | 11/2011 | Velazquez | H04L 12/66 370/352 |
| 8,755,767 B2 | 6/2014 | Maier et al. | |
| 9,014,661 B2* | 4/2015 | deCharms | H04W 4/021 348/14.02 |
| 9,300,784 B2* | 3/2016 | Roberts | H04M 1/72536 |
| 2008/0101553 A1 | 5/2008 | Goldman et al. | |
| 2008/0153455 A1* | 6/2008 | Lancaster | H04M 7/006 455/405 |
| 2011/0206036 A1 | 8/2011 | DeWeese | |
| 2011/0244887 A1 | 10/2011 | Dupray et al. | |
| 2012/0088468 A1* | 4/2012 | Dickinson | H04W 4/22 455/404.2 |
| 2012/0135704 A1* | 5/2012 | Gunasekara | H04L 12/6418 455/404.2 |
| 2012/0157795 A1* | 6/2012 | Chiu | G06F 19/3418 600/301 |
| 2012/0309340 A1 | 12/2012 | Ray | |
| 2013/0078943 A1 | 3/2013 | Biage et al. | |
| 2013/0178185 A1 | 7/2013 | Park et al. | |
| 2013/0237181 A1 | 9/2013 | Ray | |
| 2015/0156321 A1 | 6/2015 | Abnett et al. | |

* cited by examiner

*Primary Examiner* — Cong Tran
(74) *Attorney, Agent, or Firm* — Brient Globerman, LLC

(57) ABSTRACT

Computer systems, according to various embodiments, are adapted to assist emergency services providers in determining the location of an individual who is in need of help. In various embodiments, the system may be adapted to determine a current dispatchable location for the individual who is in need of help, update a data structure associated with a public-safety answering point to indicate the individual's current location, and then initiate and/or mediate a call between the individual and the emergency services provider. In various embodiments, updating the database may provide more accurate information regarding the individual's location than would otherwise be available for the individual.

21 Claims, 9 Drawing Sheets

FIG. 5

CALLER LOCATION DETERMINATION SYSTEMS AND METHODS

CLAIM OF PRIORITY

This application is a continuation-in-part of U.S. patent application Ser. No. 14/939,702, filed Nov. 12, 2015, entitled "Caller Location Determination Systems and Methods," the entire disclosure of which is hereby incorporated by reference in its entirety.

BACKGROUND

In the past, when an individual placed an emergency call (e.g., a "911" call), the individual did so via a landline that was associated with a particular physical location. Accordingly, if necessary, emergency service providers could determine the current location of the caller by simply identifying the phone number associated with the incoming call and then accessing the address associated with the phone number via, for example, a suitable database.

With the increase in popularity of alternative voice communications mediums such as cellular phones, voice-over-IP, voice-over-LTE and others, the percentage of emergency calls that are made using these communications mediums has increased dramatically. This has created a very large problem in that when an emergency service receives such a call, they cannot reliably determine the location of the caller based on the caller's phone number alone. Instead, emergency services typically ask the caller for their location before obtaining any additional information from the caller. If the caller is unable to speak or provide directions to their current location, the emergency service may, for example, try to obtain location information for the caller using triangulation techniques or other, often unreliable, location determination techniques. This often results in emergency service providers not being able to locate the caller in time to help them. This same issue applies to Voice-over-IP (VOIP) phones, which are portable and may be used in any location with a suitable Internet connection. There are presently a number of initiatives under way that seek to provide accurate dispatchable locations to Public Safety Answering Point (PSAPs) at the time of emergency calls, but all of the known proposed initiatives require substantial investments in new hardware and/or software on the part of network providers, mobile phone service providers, PSAPs or others.

Accordingly, there is a currently an urgent need for improved systems and methods that make use of existing technological infrastructures to identify the location of individuals making emergency calls, and other calls, via cellular phones, other portable communications devices (e.g., voice communications devices) and computing devices, while still being able to provide the Public Safety Answering Point (PSAP) with an accurate "dispatchable location" (a term well known in the art) to send first responder(s) to when such an emergency call is placed.

SUMMARY

A non-transitory computer-readable medium, according to various embodiments, stores computer-executable instructions for: (1) determining a current location of a portable computing device; (2) receiving from a particular individual, via a user interface of a portable computing device, a request to place an emergency call; and (3) at least partially in response to receiving the request to place an emergency call: (a) using the determined current location of the portable computing device to determine a dispatchable location for use in dispatching emergency assistance to the particular individual; (b) updating a data structure to indicate that the portable computing device is at the determined current location, the data structure being a data structure that a particular public-safety answering point that will be handling the emergency call will access to determine location information for individuals who contact the public-safety answering point to request emergency assistance; and (c) initiating an emergency call, by the portable computing device, to the public-safety answering point, regarding an emergency involving the particular individual.

A system, according to certain embodiments, comprises: (1) one or more computer processors; and (2) memory storing computer-executable instructions that, when executed by the one or more computer processors, cause the one or more computer processors to perform operations comprising: (a) determining a current location of a portable computing device of a particular individual; (b) receiving a request to place an emergency call requesting help for the particular individual; and (c) at least partially in response to receiving the request to place an emergency call: (i) using the determined current location of the portable computing device to determine a dispatchable location for use in dispatching emergency assistance to the particular individual; (ii) updating a data structure to indicate that the portable computing device is at the determined current location, the data structure being a data structure that a particular public-safety answering point that will be handling the emergency call will access to determine location information for individuals who contact the public-safety answering point to request emergency assistance; and (iii) initiating an emergency call, by the portable computing device, to the public-safety answering point, regarding an emergency involving the particular individual.

A computer-implemented method, according to various embodiments, of initiating an emergency call to an emergency services provider for an individual who is in need of emergency assistance, and for providing, to the emergency services provider, an accurate dispatchable location for the individual for use in dispatching emergency assistance to the individual, comprises: (1) using one or more computing devices to continuously monitor a location of the individual's portable computing device; (2) receiving a request to place an emergency call; and (3) in response to receiving the request to place an emergency call: (a) updating a particular data structure with a current dispatchable location for the individual, as determined by the one or more computing devices that are continuously monitoring the location of the individual's portable computing device, the particular data structure being a data structure that a particular public-safety answering point, that will be handling the emergency call, accesses to determine location information for one or more individuals who are in need of emergency assistance; and (b) initiating an emergency call to the public-safety answering point, regarding an emergency involving the individual.

A computer-implemented method, according to various embodiments, for initiating an emergency call to an emergency services provider for an individual who is in need of emergency assistance, and for providing an accurate, dispatchable location for the individual, to the emergency services provider, for use in dispatching emergency assistance to the individual, comprises, in response to receiving the request from a user to request initiation of the emergency call: (1) analyzing, in real time, current location data for the individual from a geolocation cache database, to determine a suitable current dispatchable location for the individual;

(2) in response to determining the suitable current dispatchable location for the individual, updating an ALI database, in real time, to reflect that the individual's location is the determined current dispatchable location, the ALI database being an ALI database that a public-safety answering point that will handle an emergency call placed by the individual will access to determine the current location of the individual; and (3) initiating the emergency call to the particular public-safety answering point.

BRIEF DESCRIPTION OF THE DRAWINGS

Various embodiments of caller location determination systems and methods are described below. In the course of this description, reference will be made to the accompanying drawings, which are not necessarily drawn to scale and wherein:

FIGS. 5-9 are example screen shots of a graphical user interface of a system according to a certain embodiment.

DETAILED DESCRIPTION OF SOME EMBODIMENTS

Figure 1:
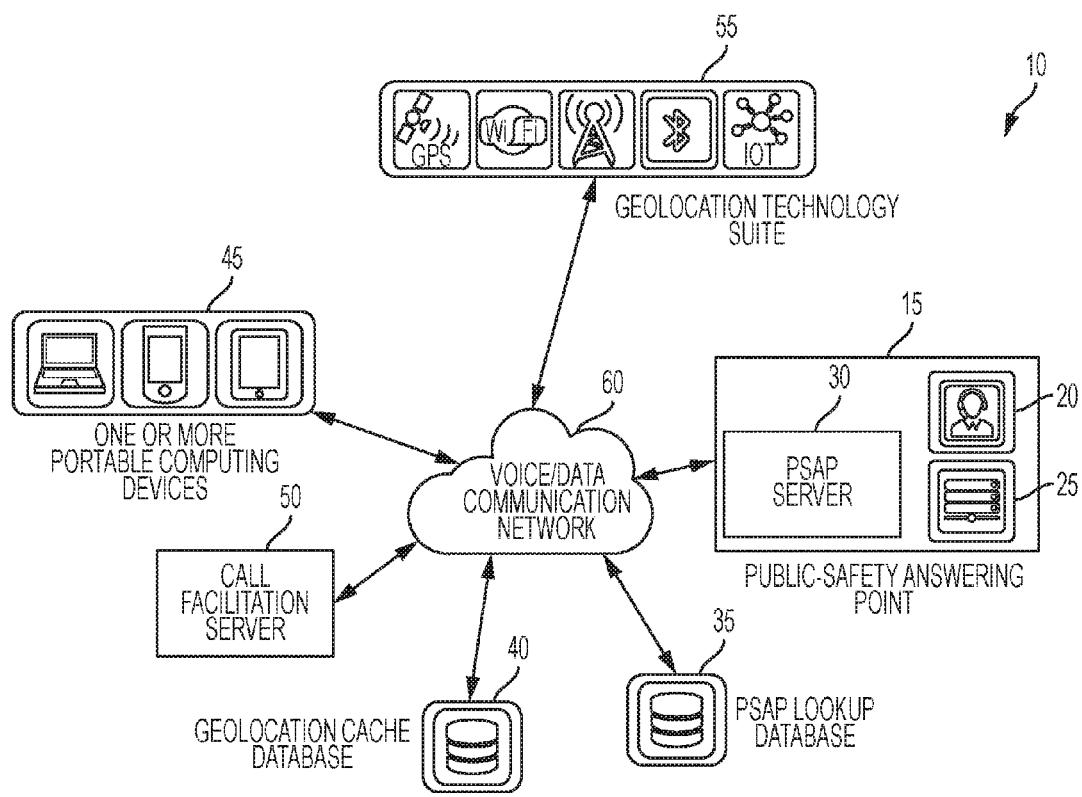
FIG. 1 is a block diagram of a Caller Location Determination System in accordance with an embodiment of the present system.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Systems and methods according to various embodiments may be used to initiate and/or mediate an emergency call and to facilitate providing an accurate dispatchable location to an emergency services provider that is handling the call. In particular embodiments, the system is adapted to collect telemetry information from various sources, which may be endogenous and/or exogenous to the voice communications device (or other communications device) being used to place the emergency call (which may be a computing device, such as a smartphone, tablet computer, etc., with or without cellular communications capabilities). The system may then relay some or all available telemetry data to a central geolocation cache database. When the need arises for an individual to request emergency assistance (or other assistance), the system analyzes some or all available data stored in the geolocation database (e.g., at least substantially in real time—e.g., in real time) to determine the most likely candidate dispatchable location and to then cause the dispatchable location to be communicated, at least substantially in real time (e.g., in real time or near real time), to a database associated with the PSAP that will be handling an emergency call from the individual and, subsequently, to the individual (e.g., employee) at the PSAP that answers the call for assistance. Particular embodiments may also be adapted to facilitate placement of, and/or mediation of, the emergency call from the individual to the PSAP.

Systems and methods according to particular embodiments provide one or more user-controlled mechanisms that may supplement and/or replace some or all of the telemetry data communicated to the geolocation cache database and to optionally update the geolocation database and, optionally in near real time or real time, further update the PSAP lookup database with a dispatchable location provided by the user of the communications device (e.g., voice communications device). Certain, but not all possible embodiments use existing technologies, frameworks and architectures so as to not require expensive hardware and/or software upgrades on the part of the PSAPs, network providers, mobile phone service providers, or other entities.

In various embodiments, the system may be adapted to accurately determine and communicate the current location of a caller who is making an emergency call (or other call) using a portable computing device, such as a cellular phone (e.g., a smartphone), VOIP telephone, or tablet computer. In various embodiments, the system allows a user to use a software application (e.g., an "app" running on their portable computing device, or an operating system of a particular computing device) to communicate geolocation telemetry and/or specify their likely location when the user is in one or more particular geographical locations. As a particular example, the user might specify that, when they are identified as being within a pre-determined radius (e.g., a 100-yard radius) of their workplace, their likely location is at their workplace, on the second floor, in office 212. Similarly, the user might specify that, when they are identified as being within a pre-determined (e.g., optionally user-selectable) radius (e.g., a 50 yard radius) of their home, their likely location is at their home.

The system may be configured to automatically update the user's current location in the system's memory based on the user's current location. For example, if the user travels from their home to work, the system may: (1) in response to the user moving outside of the pre-determined radius of their home, automatically update the user's location from "222 Peachtree Lane, Atlanta, Ga." (their home address) to the user's current location, as determined by executing an algorithm utilizing the various telemetry data stored in the geolocation cache database; and (2) in response to the user moving within a pre-determined radius of their workplace, automatically update the user's current location to "111 Workplace Avenue, Atlanta, Ga." (the user's work address). In this way, the system may track, in real time, detailed information regarding the individual's most likely location based on the current indicated location of their portable computing device (e.g., smartphone).

In particular embodiments, at least partially in response to the user using their portable computing device to call an emergency service provider, the system first communicates the individual's current location (as determined above) along with the individual's phone number to a database associated with an emergency service provider (e.g., a "PSAP Lookup Database" such as a public automatic line information database) to indicate that the most likely dispatchable location of the portable computing device associated with the individual's phone number is the individual's communicated current location. During this transmission, the system may also transmit any other suitable information regarding the individual—for example, a photo of the individual, information regarding the individual's medical history (e.g., allergies to medicine, recent medical procedures, etc.), and/or contact information for one or more people who hold the individual's medical power of attorney, next of kin and other relevant information.

After (or optionally during or before) the transmission of this information, the system may initiate and/or mediate a call from the individual to the emergency service provider. After answering the call, an emergency service provider representative answers the call and the representative's computer automatically retrieves the dispatchable location information for the individual by using the incoming phone number as a key in the PSAP Lookup Database. The representative's computer system may then convey the information to the emergency service provider representative in any suitable manner (e.g., by displaying the information on the representative's display screen). The representative may then use this information to direct emergency workers (e.g., a first responder) to the individual's current location.

In particular embodiments, the system may be configured to allow a first individual to place an emergency call on behalf of a second individual, who is with the first individual and who is in need of emergency assistance. In one such embodiment, the system may be configured to allow the first individual to input the second individual's name into the system (e.g., via a suitable graphical user interface) along with any other pertinent information regarding the second individual (e.g., the second individual's telephone number or other contact information, and/or the second individual's appearance, current physical condition, medical background, etc.). The system then determines a current dispatchable location for the first individual as described elsewhere herein) and communicates the second individual's name and other pertinent information, along with the determined current dispatchable location for the first individual and the first individual's phone number (and/or, optionally, the second individual's telephone number or other contact information), to a database associated with an emergency service provider (e.g., a "PSAP Lookup Database" such as a public automatic line information database).

As described in greater detail elsewhere herein, the system may then initiate a call to the emergency service provider. The emergency service provider may then use either the first individual's phone number (or other uniquely identifying data for the first individual) or the second individual's phone number (or other uniquely identifying data for the second individual) as a key to look up information from the database, associated with the emergency service provider, that was previously updated by the system (e.g., immediately before the emergency call was placed to the emergency service provider). The emergency service provider's computer system then displays the current dispatchable location of the first individual, the second individual's name, and the other pertinent information regarding the second individual to an emergency service representative (e.g., via a suitable display screen), and the emergency service representative then uses that information to dispatch a suitable emergency service provider to the second individual.

In other embodiments, if a caller (e.g., the first individual) is not in the same location as the individual who is in need of assistance (e.g., the second individual), the system may operate as described above except that, instead of effectively using the first individual's dispatchable location as the second individual's dispatchable location, the system may have the first individual specify the actual location of the second individual (e.g., by entering the second individual's current address, room number, etc. into the system using a suitable graphical user interface, or selecting a location, via a suitable user interface, that was previously entered into the system), and then determine a suitable dispatchable location for the second individual based on the location information provided by the first individual. (This process may or may not, for example, involve using the "snap-to" techniques described in greater detail below.) The system then functions as described above except that, rather than updating the database associated with the emergency service provider (e.g., the PSAP database or other suitable database) with a dispatchable location that has been calculated based on the first individual's whereabouts, the system updates the database with the determined dispatchable location for the second individual.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, thumb drives, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a standalone software package, partly on a user's computer and partly on a remote computer, or entirely on the remote computer or server. The remote computer may be connected to the user's computer through any suitable type of network, including but not limited to: (1) a local area network (LAN); (2) a wide area network (WAN); and/or (3) a cellular network. It should be understood that a particular computer's connection to the network may be made via an external computer (for example, by connecting to the internet via a "hotspot" provided by a portable wireless device).

The computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of a caller location determination system 10 according to particular embodiments. As may be understood from this figure, the caller location determination system 10 includes: (1) one or more portable computing devices 45, which may, for example, include one or more cellular phones (e.g., a smartphone or traditional cellular phone), tablet computers, and/or laptop computers; (2) a call facilitation server 50 that may, for example, be remote from the one or more remote computing devices 45; (3) a geolocation cache database 40 that may include hardware and/or software that facilitates determining the geographic location of the one or more portable computing devices 45 and (4) a geolocation telemetry collection technology suite, which may include one or more devices for acquiring the telemetry related to the geographic location of the one or more portable computing devices 45; this geolocation technology suite may include hardware that is located on or within the one or more portable computing devices 45 and may include, for example, a GPS unit within the one or more portable computing devices 45, one or more accelerometers within the one or more portable computing devices 45, one or more wireless networking chips within the one or more portable computing devices 45, one or more Bluetooth chips stored within the wireless computing devices, one or more barometers stored within the one or more portable computing devices 45, and/or one or more devices located outside the one or more portable computing devices 45 (e.g., one or more cellular towers that are adapted for approximating the location of the one or more portable computing devices 45 via triangulation techniques, one or more wireless routers, etc.)

As may be understood from FIG. 1, the system may also include a call processing system 25 and a Public Safety Answering Point Server 30 that, for example, may be located at a Public Safety Answering Point 15 that is staffed by one or more PSAP representatives 20. The system may further include a PSAP Lookup Database 60 (which may be, for example, a public automatic line information database) that is used for storing information (e.g., location information) that is associated with respective phone numbers (e.g., cell phone numbers or Voice-Over-IP (VOIP) numbers) and a Geolocation Cache Database 40.

The system may further include one or more voice and/or data communication networks 60 for initiating and/or mediating communication between the various system components discussed above. These one or more networks 60 may include any of a variety of types of wired or wireless computer networks such as the Internet (or other WAN), a private intranet, a mesh network, a public switch telephone network (PSTN), or any other type of network (e.g., a network that uses Bluetooth (standard or low energy Bluetooth), beacon communication technologies (e.g., iBeacon), and/or near field communications to facilitate communication between computing devices).

Figure 2:
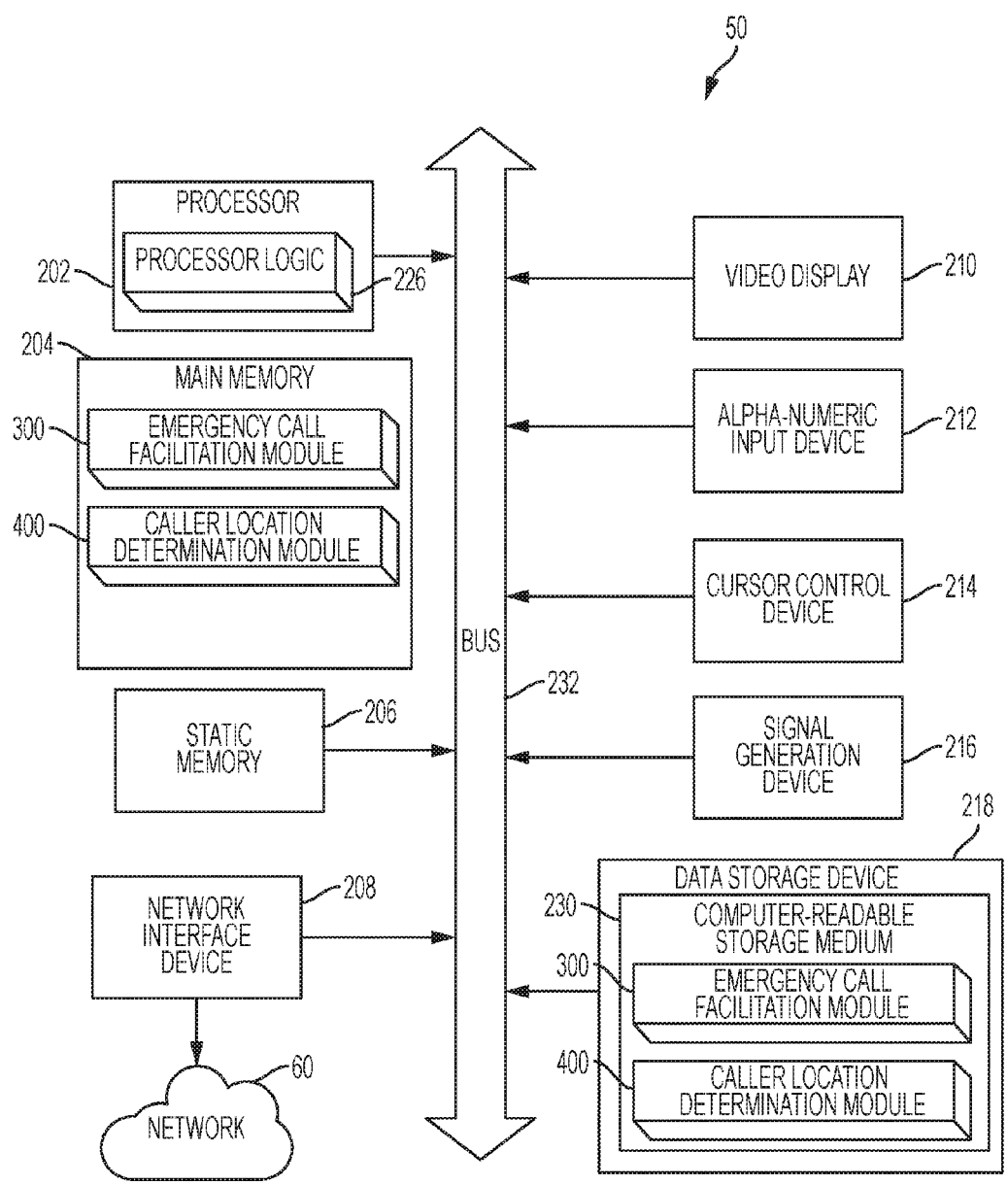
FIG. 2 is a block diagram of the Call Facilitation Server of FIG. 1.

FIG. 2 illustrates an exemplary diagrammatic representation of the architecture of a Call Facilitation Server 50 that may be used within the caller location determination system 10. It should be understood that the computer architecture shown in FIG. 2 may also represent the computer architecture of any one of the one or more portable computing devices 45, the PSAP Server 30 and/or the geolocation cache database 40 shown in FIG. 1.

In particular embodiments, the Call Facilitation Server 50 may be connected (e.g., networked) to other computing devices in a LAN, an intranet, an extranet, and/or the Internet or other suitable network as shown in FIG. 1. As noted above, the Call Facilitation Server 50 may operate in the capacity of a server or a client computing device in a client-server network environment, or as a peer computing device in a peer-to-peer (or distributed) network environment. The Call Facilitation Server 50 may be a desktop personal computing device (PC), a tablet PC, a set-top box (STB), a Personal Digital Assistant (PDA), a cellular telephone, a web appliance, a network router, a switch or bridge, a physical computer server, a cloud-based logical computer server and/or any other computing device capable of executing a set of instructions (sequential or otherwise) that specify actions to be taken by that computing device. Further, while only a single computing device is illustrated, the single term "computing device" (or other such singular terminology referring to a computing device) should also be interpreted to include any collection of computing devices that individually or jointly execute a set (or multiple sets) of instructions to perform any one or more of the methodologies discussed herein.

As shown in FIG. 2, an exemplary Call Facilitation Server 50 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other and other system components via a bus 232.

The processor 202 represents one or more general-purpose or specific processing devices such as a microprocessor, a central processing unit (CPU), or the like. More particularly, the processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processor 202 may be configured to execute processing logic 226 for performing various operations and steps discussed herein.

The call facilitation server 50 may further include a network interface device 208. The call facilitation server 50 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computer readable storage medium 230 (also known as a non-transitory computer-readable medium) on which is stored one or more sets of instructions (e.g., the emergency call facilitation module 300 and the location determination module 400) embodying any one or more of the methodologies or functions described herein. The emergency call facilitation module 300 and the location determination module 400 may also reside, completely or at least partially, within the main memory 204 and/or within the processor 202 during execution thereof by the Call Facilitation Server 50—the main memory 204 and the processing device 202 also constituting non-transitory computer-readable storage media. The emergency call facilitation module 300 and the location determination module 400 may further be transmitted or received over a network 60 via a network interface device 208.

The network 60 although illustrated as one "cloud" for the sake of brevity and ease of understanding should be understood to include one or more LANs, one or more virtual LANs, the Internet, one or more extranets, one or more WANs and/or other any other suitable networking topologies that facilitate the movement of data from one computing device to another. As is commonly understood in the art, each of the aforementioned networks may or may not have the ability to communicate directly with each other. By way of one example, data that is destined for the Geolocation Cache Database 40 may traverse the public Internet but once received, may then be communicated (e.g., along with other data derived from the original data) via a private LAN to the Call Facilitation Server 50.

While the computing device-accessible storage medium 230 is shown in an exemplary embodiment to be a single medium, the term "computer readable medium" should be understood to include a single medium or multiple media (e.g., a centralized or distributed database, and/or associated caches and servers) that store the one or more sets of instructions. The terms "computing device-accessible storage medium" or "computer-readable medium" should also be understood to include any medium that is capable of storing, encoding, or carrying a set of instructions for execution by the computing device and that may, for example, cause the computing device to execute any one or more of the methodologies of the present invention. The terms "computing device-accessible storage medium" and "computer-readable medium" should accordingly be understood to include, but not be limited to, solid-state memories, optical and magnetic media, etc.

Operation of Exemplary System

As noted above, a caller location determination system 10, according to various embodiments, is adapted to gather telemetry related to one or more particular locations, track and/or determine the location of an individual and to communicate the individual's most likely dispatchable location to an emergency services provider (e.g., a representative at a Public-Safety Access Point). This may be useful, for example, in identifying the current location of the individual after they initiate a call to a Public-Safety Access Point requesting help in case of an emergency.

Figure 3:
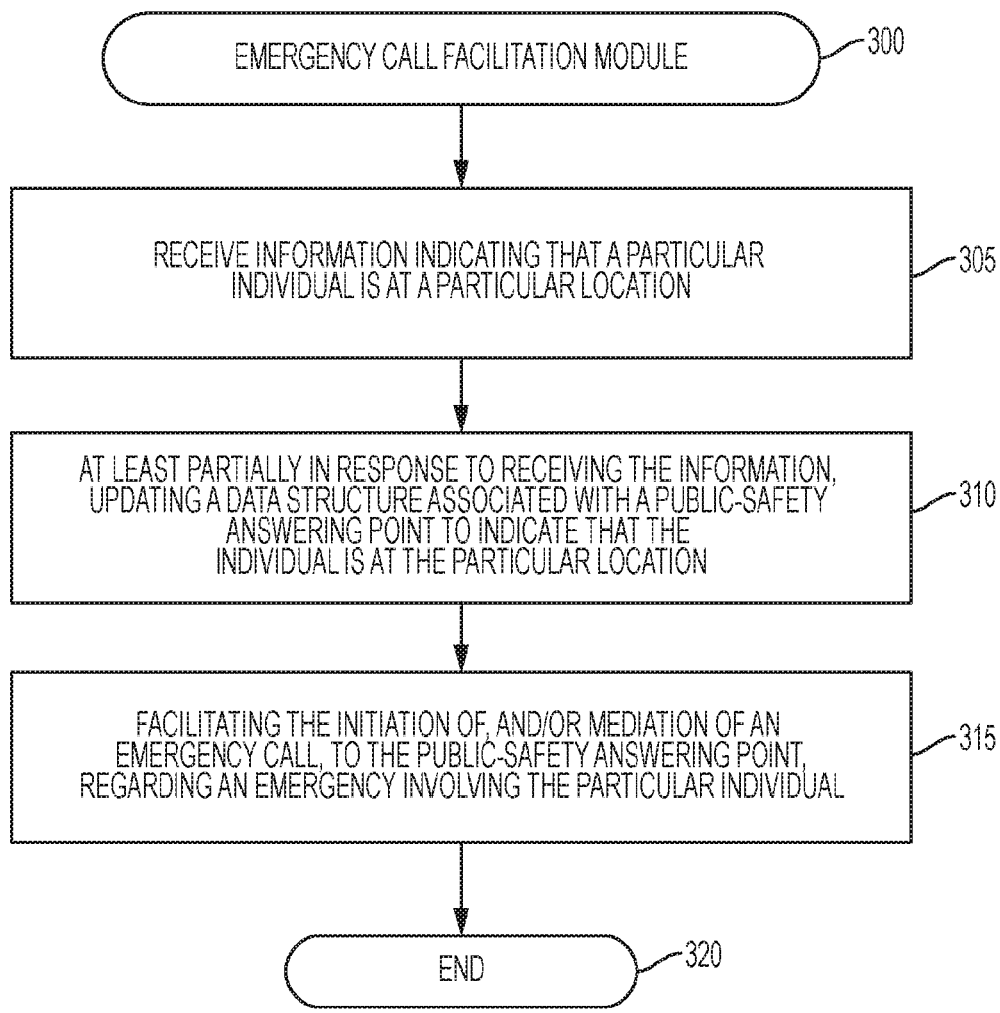
FIG. 3 is a flowchart that generally illustrates various steps executed by an Emergency Call Facilitation Module according to a particular embodiment.

FIG. 3 is a flow chart of operations performed by an exemplary Emergency Call Facilitation Module 300 according to a particular embodiment. Turning to FIG. 3, the system begins, at Step 305, by receiving information that a particular individual is at a particular location. The system may do this in any suitable way.

As a particular example, the system may receive information regarding the location of the particular individual from one or more components of a geolocation technology suite 55. For purposes of this discussion, a geolocation technology suite 55 may include, for example, one or more exogenous or endogenous systems or components that may be used in determining the location of an individual (e.g., by determining the location of a computing device in the individual's possession). For example, a geolocation technology suite 55, according to various embodiments, may include: (1) one or more GPS units associated with one or more portable computing devices 45 associated with the individual (e.g., the individual's smartphone, tablet, wearable device, etc. . . . ); (2) one or more networks 60 (e.g., wireless or wired networks) that a portable computing device associated with the individual is connected to; (3) one or more cell towers that a portable computing device associated with the individual is in communication with; (4) one or more computing devices that a portable computing device 45 associated with the individual is in communication with (e.g., via beacon technology); and/or (5) one or more RF receivers (e.g., one or more AM or FM radio receivers, or television receivers) associated with (e.g., physically embodied within) a portable computing device associated with the individual.

The system may receive the geolocation data from the geolocation technology suite 55 in any suitable manner. For example, an application running on the individual's portable computing device may be adapted to capture at least some of this information and transmit the information, via one or more suitable networks 60, to the geolocation cache database 40. In other embodiments, an operating system associated with the individual's portable computing device 45 may capture the location information and transmit the information to the geolocation cache database 40 via one or more suitable networks 60. In further embodiments, one or more third party portable computing devices (or other computing devices) that are not associated with (e.g., not owned or used by) the particular individual may run an application that automatically broadcasts the location of the particular individual in response to receiving an indication (e.g., via Bluetooth or beacon communications) that one or more of the individual's portable computing devices is adjacent the third party portable computing device.

It should be understood that the geolocation technology suite may determine and/or approximate the location of the individual in any suitable manner. For example, the system (or one or more other systems that are in communication with the system) may use information from one or more cellular towers to approximate the location of a portable computing device associated with the individual (and then assume that the individual is at same location as their portable computing device). Similarly, the system may approximate the location of an individual by first determining that the individual's portable computing device 45 is in communication a particular wireless network having a particular MAC address and then approximate the location of the individual (e.g., again assuming that the individual is near their portable computing device) by accessing a suitable database to determine a physical address associated with the MAC address.

As a further example, the system may, in various embodiments, be adapted to receive data regarding the reception of one or more RF signals (e.g., from any suitable source) adjacent the individual. For example, the system may use a radio receiver of a portable computing device associated with the individual to determine whether the radio receives one or more specific radio stations. The system may then use this information to determine at least the approximate current location of the individual. For example, the system may be adapted to tune an FM receiver of the individual's portable computing device to a particular FM frequency (e.g., 100.7 MHz) and then read the data channel to determine whether the station is a particular station that is associated with a particular geographic location (e.g., WHYI FM, which is broadcast only in South Florida). If so, the system may use this information to determine, for example, that the individual is currently in the particular geolocation. (e.g., in South Florida).

As another example, the system may use the portable computing device's FM receiver to scan the entire FM spectrum, and then enumerate all of the commercially broadcast radio stations and their relative signal strengths. The system may then use the determined FM signals and signal strengths to determine an approximate location of the individual. Similar techniques may be used for AM radio, television, and/or other RF signals (e.g., signals sent by satellites or other types of broadcasting equipment) through which a location may be inferred, or at least partially inferred, by either the existence of an RF signal and/or information encoded into the signal.

In certain embodiments, the system may receive information, from one or more social networking cites, indicating that a particular individual is at a particular location. For example, the system may receive an indication that the individual has "checked in" to a particular location on a social networking site, such as Foursquare. Similarly, the system may receive an indication that the individual has updated their status on a social networking site to indicate that they are at a particular location. In certain embodiments, the system may receive the individual's location from one or more social networking sites and/or operating systems that continuously track the location of the individual's portable computing device (e.g., smartphone or tablet). Examples may include, for example, the Tile application or a portable computing device operating system, such as iOS.

The system may also, or alternatively, determine the location of a particular individual by reviewing one or more communications sent from, or to, the individual. For example, the system may be adapted to review any electronic communications sent by or to the individual's portable computing device (or other computing device, or electronic communications account, such as e-mail or Twitter) to determine the individual's location. For example, the system may be adapted to automatically review any "Tweets" sent by an individual to determine whether they include an indication of the individual's current location. As a particular example, if the individual sends a Tweet, or other electronic communication, indicating that they are currently at NOCA restaurant in Roswell, Ga., the system may use this as an indication that the individual is located at an address associated with the restaurant NOCA in Roswell, Ga. (which the system may obtain from a suitable database of business addresses).

In various embodiments, the system may determine the likely location of an individual by "snapping to" the location of the individual. This functionality is discussed in greater detail below in conjunction with FIG. 4. For example, various embodiments of the system are described above as automatically associating a particular likely location with an individual if: (1) the individual is within a predetermined distance of the likely location, or (2) if the individual is within a particular geographic region that contains the likely location.

In particular embodiments, the system may receive a manual indication (e.g., an explicit manual indication) from a user regarding the user's location. For example, before placing an emergency call (e.g., immediately before placing the call), or while on the call, the user may select a particular indicia on a graphical user interface associated with a particular application running on their smartphone (or other portable computing device 45) indicating that they are currently at their home or office address, or in another address that, for example, may have been preprogrammed into the system's memory (e.g., using the software application). For example, the system may request that the user select one of the user's pre-entered locations when the user uses the system to initiate the emergency call. (See, for example, FIG. 7, which shows a system that allows the user to select between four different pre-entered locations (e.g., "My Home", "My Main Office", "Grandma's House", "Steve's Apartment") before placing an emergency call. In particular embodiments, the system may be adapted to allow a user to manually type their current location into the system immediately before or during the emergency call.

In various embodiments, after receiving information from one or more sources regarding the current location of the individual, the system applies a pre-determined set of rules (e.g., a location-determination algorithm) to determine a most likely current dispatchable location for the individual. In various embodiments, the system may, for example, be configured to regard certain types of location information as more accurate than others and to use those more accurate sources of information in favor of other sources when necessary to choose between information from multiple sources.

Also, the system may be configured to take the number of location sources indicating that a particular individual is at a particular location into account when determining the most likely location of an individual. For example, if the system receives information from four different sources indicating that an individual is at a particular movie theater, and the system receives information from a single source indicating that the individual is at home, the system may be adapted to determine that the individual is likely at the movie theater since multiple sources indicate that the individual is at the movie theater, and only a single source indicates that the individual is at home.

The following are several examples of rules that the system may follow when determining the most likely dispatchable location of an individual from a multiple location sources that, respectively, indicate different locations for an individual: (1) prefer location information that was provided manually by an individual over all other location information; (2) prefer GPS information over information determined using triangulation techniques; (3) prefer information derived from direct communication between the individual's portable computing device and a particular network or computing device over information determined using triangulation techniques.

Returning to FIG. 3, in various embodiments, at Step 310, the system is adapted for, at least partially in response to determining the most likely dispatchable location for the individual (e.g., after making this determination), updating a data structure associated with a public-safety answering point to indicate that the individual is at the determined dispatchable location. For example, the system may (e.g., using a suitable API) update a public ALI database that is used by the PSAP to indicate that the individual is at the system-determined dispatchable location. The system may do this, for example, by updating one or more records in the database to indicate that the portable computing device associated with the individual's cellular phone number is located at the system-determined dispatchable location. In other embodiments, the system may update the PSAP's database directly (e.g., in this same manner) to reflect the individual's current location.

As discussed in greater detail below, the system may update the data structure associated with the public-safety answering point with any suitable information. Such information may include, for example: (1) the individual's current dispatchable location; (2) the actual longitude and latitude of the user's portable computing device 45; (3) the location of an individual within a particular building (e.g., a particular room description or room number); (4) a description of the individual (e.g., the individual's gender, age, height, hair color, and/or eye color); (5) one or more medical conditions of the individual (e.g., one or more allergies of the individual); (6) the fact that the individual is blind, deaf, or unable to speak; (7) one or more languages spoken by the individual; (8) one or more images of the individual (e.g., pictures or videos); (9) contact information for one or more individuals associated with the particular individual (e.g., one or more emergency contacts for the individual); or (10) any other suitable information for the individual. In particular embodiments, the information may include one or more links to one or more of the types of information described above (e.g., the information may include a link to a picture of the individual, or a link to the individual's electronic medical records).

Next, the system proceeds to Step 315, where it facilitates the initiation of, and/or mediation of, an emergency call to the public-safety answering point (e.g., regarding an emergency involving the individual). The system may do this in any suitable manner using any suitable hardware and/or software. For example, the system may initiate the call via the individual's portable computing device (e.g., the individual's smartphone) and/or use any other suitable communications hardware or software to initiate and/or mediate the call.

In various embodiments, it is noted that the system may include a Call Facilitation Server 50 that may be adapted to act as a communications bridge between the one or more portable computing devices 45 and the Public-Safety Answering Point 15. In particular embodiments, the Call Facilitation Server 50 may be adapted to initiate and maintain a communications channel between the PSAP 15 and the Call Facilitation Server 50 while maintaining a separate communications channel directly with the user's portable computing device 45. This may help to maintain consistent staffing of the emergency call because, even if the communications channel between the user's portable computing device 45 and the Call Facilitation Server 50 becomes unavailable, the connection between the Call Facilitation Sever 50 and the PSAP may be maintained. This may allow the user to re-establish a call with the same emergency services representative by simply reestablishing communications between the user's portable computing device 45 and the Call Facilitation Server 50.

In alternative embodiments, the system may not include a Call Facilitation Server 50. In such embodiments, the system's call generation functionality may, for example, be located entirely on the user's portable computing device. Also, in certain embodiments, one or more functions described herein as being performed by the Call Facilitation Server 50 may be executed by one or more servers that aren't configured to initiate or mediate calls.

In particular embodiments, the system (e.g., the Call Facilitation Server 50, or one or more other system components) may include text-to-speech functionality for using computer-generated sound to communicate information (e.g., the user's current location) to emergency representatives in the course of an emergency call that has been initiated as described above. This may be useful, for example, if the user cannot physically speak, or if they are in a situation where it wouldn't be advisable to speak.

Figure 4:
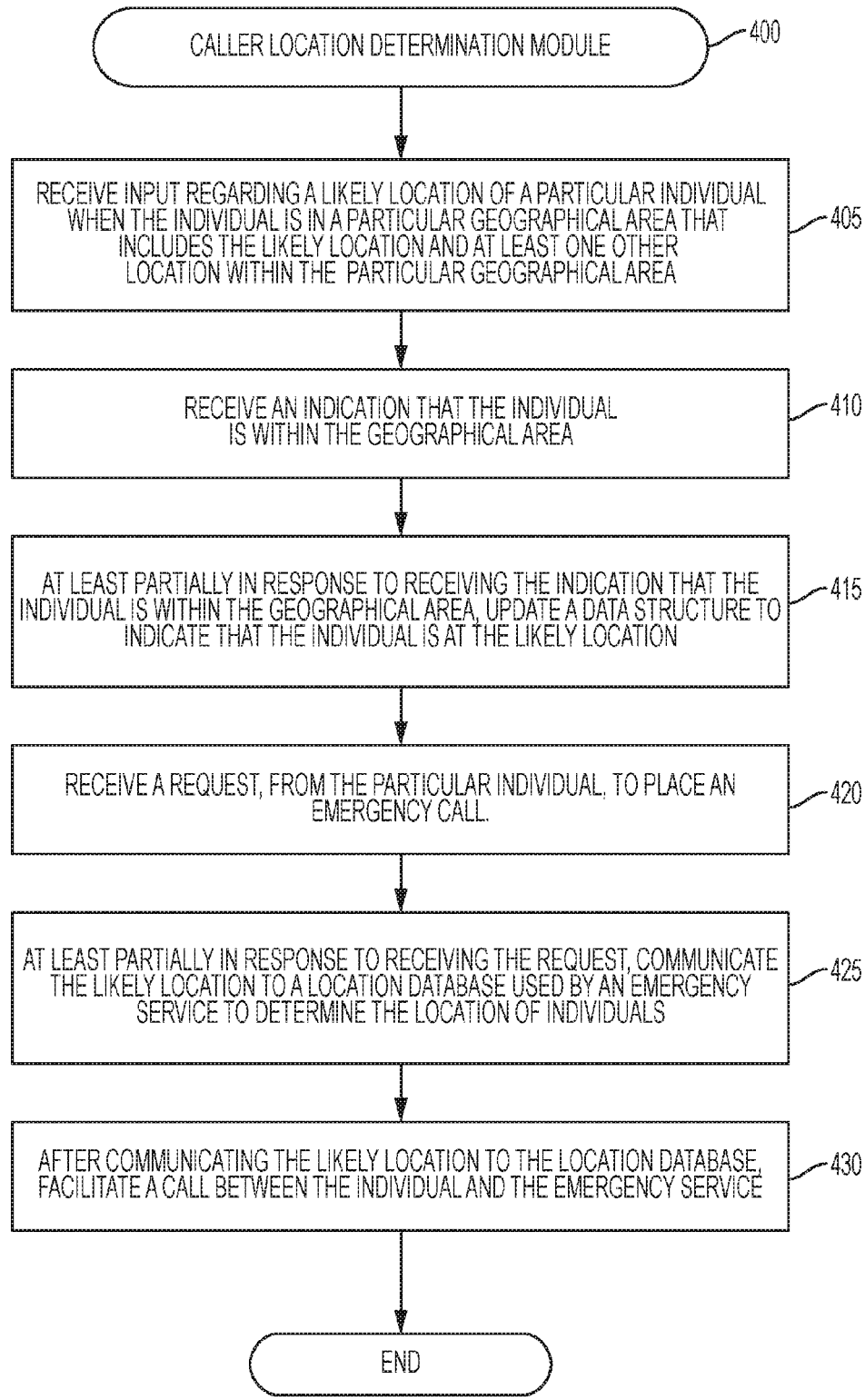
FIG. 4 is a flowchart that generally illustrates various steps executed by a Caller Location Determination Module according to a particular embodiment.

FIG. 4 is a flow chart of operations performed by an exemplary location determination module 400 according to a particular embodiment. Turning to FIG. 4, the system begins, at Step 405, by receiving input regarding a likely location of a particular individual when the individual is in a particular geographical area that includes both the likely location and at least one other location within the particular geographical area. As a particular example, the user might specify that, when they are identified as being within a pre-determined radius (e.g., a 100 yard radius) of their workplace (which the user may define, for example, using an address, a geolocation of the workplace, etc.), their likely location is at their workplace, on the second floor, in the office in the Northwest corner of the building. Similarly, the user might use the system to define a geofence that includes their workplace and specify that, when they are identified as being within the user-defined geofence, their likely location is at their workplace, on the second floor, in office 212. As a further example, the user might specify that, when they are identified as being within a pre-determined radius (e.g., a hundred foot radius) of an address or within a geolocation that corresponds to their home, their likely location is at their home.

As a further example, the system may allow a user to input their likely location at a particular address if they are determined to be at that particular address. For example, if an individual is staying at a particular hotel, after the individual arrives at the hotel and checks in, they may use the system to save, to the system's memory, an indication that, if they are determined to be at the hotel, they will likely be in a particular room in the hotel (e.g., the particular room that the individual is staying in at the hotel—e.g., Room 207).

The system may accept the input described above in any suitable manner. For example, the system may be adapted to store and run an application (e.g., an "app") on a portable computing device 45 (e.g., a smartphone or tablet) associated with the user. In such embodiments, the user may, for example, use a graphical user interface (or other interface) associated with the application to enter one or more location titles along with detailed location information regarding each location.

Figure 6:
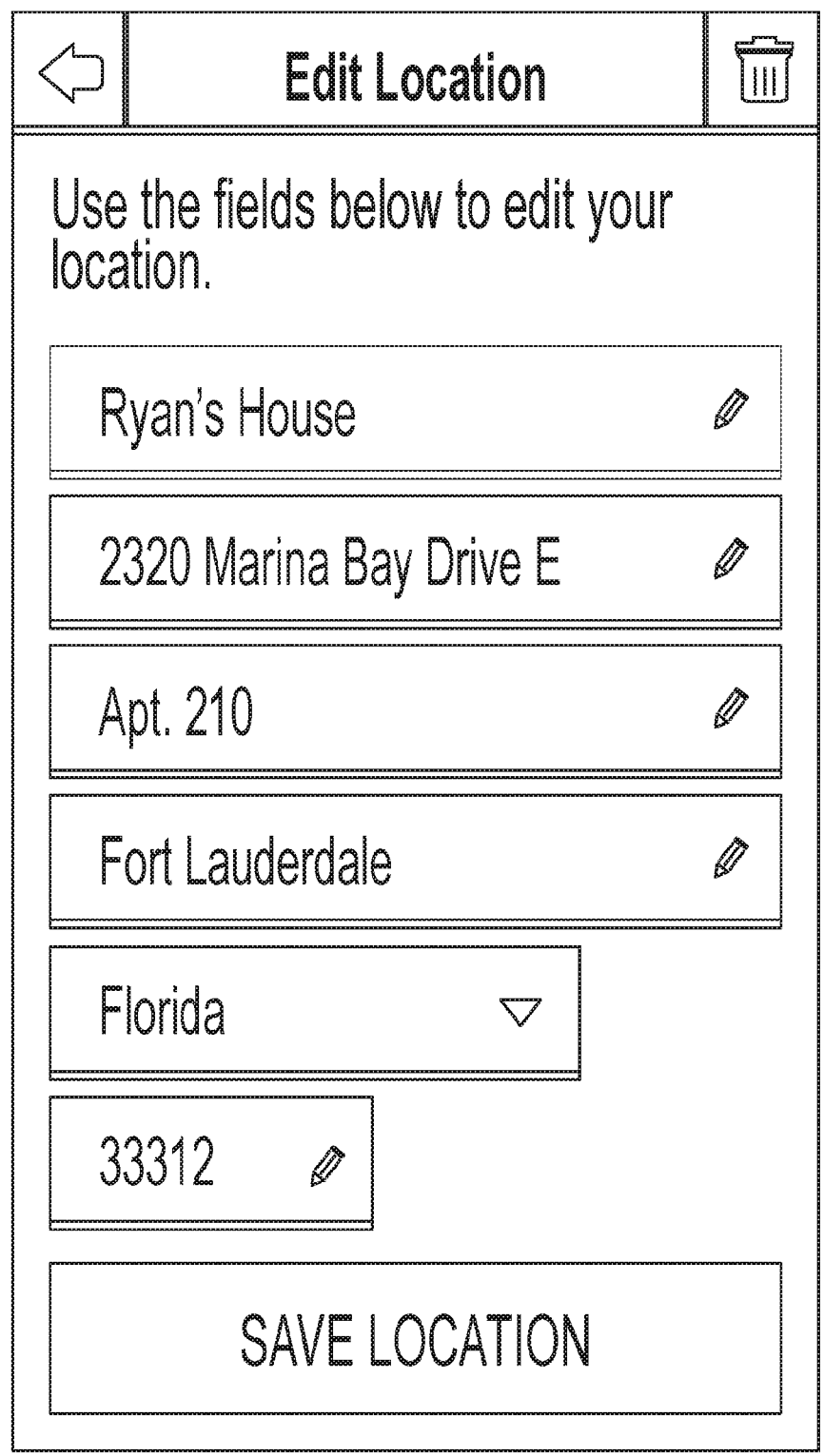
Figure 7:

An example location input interface screen is shown in FIGS. 5 and 6. As may be understood from this screen, the user interface may be operable to accept a title of a particular location (e.g., "Ryan's House") along with location information (e.g., an address and/or geocode for the location) for that particular location. As shown in FIG. 7, the system may enter multiple locations into the system (e.g., the individual's home address, work address, gym address, friends' addresses, etc.)

Returning to FIG. 4, after the user enters one or more locations into the system, the may track the location of the user (e.g., in real time, substantially in real time, or with a time delay) using any suitable location tracking technique (e.g., by tracking the location of a portable computing device or other location detection device associated with the user—such as the user's smartphone, smart watch, tablet computer, GPS chip, etc.; by tracking user's location via one or more social media web sites; by tracking the location of a vehicle associated with the user; or by using any other suitable location-tracking technique).

As the system tracks the user, the system may, for example at Step 410, receive an indication that the individual is within one of the geographical areas that the system received information regarding at Step 405. In various embodiments, the system may, at least partially in response to receiving the indication that the individual is within the geographical area, update a data structure (e.g., a PSAP Lookup Database 35, or other database associated with one or more emergency service providers, or any other suitable data structure) to indicate that the individual is at the likely location. During this transmission (or as part of a separate transmission), the system may also update the data structure to include any other suitable information regarding the individual—for example, information regarding the individual's medical history (e.g., allergies to medicine, recent medical procedures, etc.), or contact information for a person who holds the individual's medical power of attorney.

Figure 8:
Figure 9:

The system may also, at least partially in response to receiving the indication that the individual is within the geographical area, change a graphical user interface associated with the system to indicate that the system has determined that the user is at the likely location. For example, FIGS. 8 and 9 show the system's progression between showing that the user is not at the user's office (See FIG. 8, in which the user's office is not highlighted), and showing that the user is at the user's office (See FIG. 9, in which the user's office is highlighted and the system is displaying an indication (e.g., an alphanumeric message) that the user is within 150 feet of the user's office and, therefore, the system is listing the user's location as the address of the user's office (4402 Northeast 11$^{th}$ Avenue, Oakland Park, Fla.)).

Turning again to FIG. 4, if the user experiences an emergency, the user may initiate a call to emergency services provider. The user may do this, for example, by selecting an appropriate "emergency call" button of a graphical user interface displayed by an application on their portable computing device (e.g., smartphone) 45 (such as the "Start Emergency Call" button shown in FIG. 7), or by simply dialing an appropriate emergency services number (e.g., 911) on their portable computing device. The system then, at Step 420 receives the request from the user to place an emergency call and then, at Step 425, at least partially in response to receiving the request, communicates the likely location to a location database used by an emergency service to determine the location of individuals (e.g., the PSAP Lookup Database 35).

Next, after communicating the likely location to the location database, the system advances to Step 430 where it facilitates a call between the individual and the emergency service provider (e.g., a PSAP). The system may do this, for example, by simply executing a call to a predetermined emergency phone number (e.g., 911). Alternatively, the system may initiate communications between the individual and the emergency service provider in any other suitable manner (e.g., via video communications, SMS communications, etc.).

After answering the call, an emergency service provider representative answers the call and the representative's computer automatically retrieves position information for the individual by using the incoming number as a key in the PSAP Lookup Database. The representative's computer system may then convey the information to the representative in any suitable manner (e.g., by displaying the information on the representative's display screen). The representative, and/or any suitable computer system may then use this information to direct emergency workers to the individual's current location.

Variations and Additional and Alternative Embodiments

Various embodiments may include additional features beyond those described above. For example, in particular embodiments, the system may be adapted to allow a user to enter contact information for one or more individuals that the user would like the system to automatically notify if the user places an emergency call. In particular embodiments, in response to the user initiating an emergency call, the system automatically initiates a communication to those one or more individuals. This may, for example, serve to notify the specified individuals of the fact that the user has placed an emergency call. The communication may optionally include the user's location and/or other information, such as one or more automatically generated images from the user's portable computing device. This may allow the specified individuals to provide immediate help to the user and/or to contact an emergency services provider on behalf of the user.

In certain embodiments, the system may be adapted to cause the user's portable computing device to automatically capture data from their present location, which may be useful in determining their present circumstances (e.g., on an ongoing basis until this feature is manually turned off). For example, the system may cause the portable computing device to take a picture every predetermined period of time (e.g., every three seconds) and transmit that picture to an emergency service provider or other individual and/or computer for use in assessing the status of the individual during an emergency (e.g., after the user places an emergency call). The system may also or alternatively activate a microphone associated with the user's portable computing device so that emergency service providers can hear what is happening proximate the user.

In certain embodiments, the system may be adapted to cause the individual's portable computing device to transmit an electronic and/or sound beacon. This may help rescue workers in locating the individual.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. It should also be specifically understood that any steps executed within a set of computer-executable instructions would, at least in various embodiments, be executed by at least one computer processor associated with memory.

Also, although various embodiments are described above as using a smartphone or tablet as the "portable computing device" used in various embodiments, it should be understood that other portable computing devices (e.g., portable computerized devices that fall within the "Internet of Things"—e.g., computerized cars, shoes, pens, suitcases etc.) may also be used in the context of certain embodiments. It should also be understood that, in particular embodiments, non-portable computing devices, such as ATM machines, non-portable household appliances and desktop computers, may also be used in place of one or more of the portable computing devices described above.

Although specific terms are employed herein, they are used in a generic and descriptive sense only and not for the purposes of limitation.

What is claimed:

1. A non-transitory computer-readable medium storing computer executable instructions for:

determining a current location of a portable computing device;

receiving from a particular individual, via a user interface of a portable computing device, a request to place an emergency call; and at least partially in response to receiving the request to place an emergency call:

using the determined current location of the portable computing device to determine a dispatchable location for use in dispatching emergency assistance to the particular individual;

updating a data structure to indicate that the portable computing device is at the determined current location, the data structure being a data structure that a particular public-safety answering point that will be handling the emergency call will access to determine location information for individuals who contact the public-safety answering point to request emergency assistance; and initiating an emergency call, by the portable computing device, to the public-safety answering point, regarding an emergency involving the particular individual, wherein the step of determining a current location of the portable computing device comprises:

receiving a first current location for the individual, as determined via triangulation techniques;

receiving a second current location for the individual, the second current location having been input into the mobile computing device by the user as part of the request to make the emergency call; and determining to use the second current location as the individual's current location based on a set of rules that specifies that location information provided by the particular individual will be used over location information determined by triangulation techniques.

2. A non-transitory computer-readable medium storing computer executable instructions for:

determining a current location of a portable computing device;

receiving from a particular individual, via a user interface of a portable computing device, a request to place an emergency call; and at least partially in response to receiving the request to place an emergency call:

using the determined current location of the portable computing device to determine a dispatchable location for use in dispatching emergency assistance to the particular individual;

updating a data structure to indicate that the portable computing device is at the determined current location, the data structure being a data structure that a particular public-safety answering point that will be handling the emergency call will access to determine location information for individuals who contact the public-safety answering point to request emergency assistance; and initiating an emergency call, by the portable computing device, to the public-safety answering point, regarding an emergency involving the particular individual, wherein the step of determining a current location of the portable computing device comprises:

receiving a first current location for the individual, as determined via triangulation techniques;

receiving a second current location for the individual, the second current location having been determined based on a MAC address associated with a computing device with which the portable computing device is currently in communication; and determining to use the second current location as the individual's current location based on a set of rules that specifies that location information associated with a MAC address will be used over location information determined by triangulation techniques.

3. A non-transitory computer-readable medium storing computer executable instructions for:

determining a current location of a portable computing device;

receiving from a particular individual, via a user interface of a portable computing device, a request to place an emergency call; and at least partially in response to receiving the request to place an emergency call:

using the determined current location of the portable computing device to determine a dispatchable location for use in dispatching emergency assistance to the particular individual;

updating a data structure to indicate that the portable computing device is at the determined current location, the data structure being a data structure that a particular public-safety answering point that will be handling the emergency call will access to determine location information for individuals who contact the public-safety answering point to request emergency assistance; and initiating an emergency call, by the portable computing device, to the public-safety answering point, regarding an emergency involving the particular individual, wherein:

the non-transitory computer-readable medium further stores computer-executable instructions for receiving information regarding a probable location of the particular individual when the portable computing device's location satisfies one or more criteria; and the step of determining a current location of the portable computing device comprises:

(a) receiving information regarding an approximate location of the portable computing device;

(b) determining whether the portable computing device's approximate location satisfies the one or more criteria; and (c) at least partially in response to determining that the portable computing device's approximate location satisfies the one or more criteria, updating the data structure to indicate that the portable computing device is at the probable location.

4. The non-transitory computer-readable medium of claim 3, wherein the step of determining whether the portable computing device's approximate location satisfies the one or more criteria comprises determining whether the portable computing device's approximate location is within a predetermined distance of the probable location.

5. A system comprising:

one or more computer processors; and memory storing computer-executable instructions that, when executed by the one or more computer processors, cause the one or more computer processors to perform operations comprising:

determining a current location of a portable computing device of a particular individual;

receiving a request to place an emergency call requesting help for the particular individual; and at least partially in response to receiving the request to place an emergency call:
    using the determined current location of the portable computing device to determine a dispatchable location for use in dispatching emergency assistance to the particular individual;
    updating a data structure to indicate that the portable computing device is at the determined current location, the data structure being a data structure that a particular public-safety answering point that will be handling the emergency call will access to determine location information for individuals who contact the public-safety answering point to request emergency assistance; and
    initiating an emergency call, by the portable computing device, to the public-safety answering point, regarding an emergency involving the particular individual, wherein the step of determining a current location of a portable computing device of a particular individual comprises:
        receiving a first current location for the individual, as determined via triangulation techniques;
        receiving a second current location for the individual, the second current location having been input into the mobile computing device by the user as part of the request to make the emergency call; and
        determining to use the second current location as the individual's current location based on a set of rules that specifies that location information provided by the particular individual will be used over location information determined by triangulation techniques.

6. A system comprising:
one or more computer processors; and
memory storing computer-executable instructions that, when executed by the one or more computer processors, cause the one or more computer processors to perform operations comprising:
    determining a current location of a portable computing device of a particular individual;
    receiving a request to place an emergency call requesting help for the particular individual; and
    at least partially in response to receiving the request to place an emergency call:
        using the determined current location of the portable computing device to determine a dispatchable location for use in dispatching emergency assistance to the particular individual;
        updating a data structure to indicate that the portable computing device is at the determined current location, the data structure being a data structure that a particular public-safety answering point that will be handling the emergency call will access to determine location information for individuals who contact the public-safety answering point to request emergency assistance; and
        initiating an emergency call, by the portable computing device, to the public-safety answering point, regarding an emergency involving the particular individual, wherein the step of determining a current location of a portable computing device of a particular individual comprises:
            receiving a first current location for the individual, as determined via triangulation techniques;
            receiving a second current location for the individual, the second current location having been determined based on a MAC address associated with a computing device with which the portable computing device is currently in communication; and
            determining to use the second current location as the individual's current location based on a set of rules that specifies that location information associated with a MAC address will be used over location information determined by triangulation techniques.

7. A system comprising:
one or more computer processors; and
memory storing computer-executable instructions that, when executed by the one or more computer processors, cause the one or more computer processors to perform operations comprising:
    determining a current location of a portable computing device of a particular individual;
    receiving a request to place an emergency call requesting help for the particular individual; and
    at least partially in response to receiving the request to place an emergency call:
        using the determined current location of the portable computing device to determine a dispatchable location for use in dispatching emergency assistance to the particular individual;
        updating a data structure to indicate that the portable computing device is at the determined current location, the data structure being a data structure that a particular public-safety answering point that will be handling the emergency call will access to determine location information for individuals who contact the public-safety answering point to request emergency assistance; and
        initiating an emergency call, by the portable computing device, to the public-safety answering point, regarding an emergency involving the particular individual, wherein:
            the memory further stores computer-executable instructions for receiving information regarding a probable location of the particular individual when the portable computing device's location satisfies one or more criteria; and
            the step of determining a current location of the portable computing device comprises:
            (a) receiving information regarding an approximate location of the portable computing device;
            (b) determining whether the portable computing device's approximate location satisfies the one or more criteria; and
            (c) at least partially in response to determining that the portable computing device's approximate location satisfies the one or more criteria, updating the data structure to indicate that the portable computing device is at the probable location.

8. The system of claim 7, wherein the step of determining whether the portable computing device's approximate location satisfies the one or more criteria comprises determining whether the portable computing device's approximate location is within a predetermined distance of the probable location.

9. A computer-implemented method of initiating an emergency call to an emergency services provider for an individual who is in need of emergency assistance, and for providing, to the emergency services provider, an accurate dispatchable location for the individual for use in dispatching emergency assistance to the individual, the method comprising:

using one or more computing devices to continuously monitor a location of the individual's portable computing device;

receiving a request to place an emergency call; and in response to receiving the request to place an emergency call:
(A) updating a particular data structure with a current dispatchable location for the individual, as determined by the one or more computing devices that are continuously monitoring the location of the individual's portable computing device, the particular data structure being a data structure that a particular public-safety answering point, that will be handling the emergency call, accesses to determine location information for one or more individuals who are in need of emergency assistance; and
(B) initiating an emergency call to the public-safety answering point, regarding an emergency involving the individual, wherein the step of using one or more computing devices to continuously monitor the location of the individual's portable computing device comprises:

storing, in computer memory, first information regarding a first probable location of the individual when a location of the individual's portable computing device satisfies a first set of one or more criteria;

storing, in computer memory, second information regarding a second probable location of the individual when a location of the individual's portable computing device satisfies a second set of one or more criteria;

receiving information, at a first time, regarding a first current approximate location of the individual's portable computing device;

determining that the first current approximate location of the individual's portable computing device satisfies the first set of one or more criteria;

at least partially in response to determining that the first current approximate location of the individual's portable computing device satisfies the first set of one or more criteria, updating a geolocation cache database to indicate that the individual's portable computing device is at the first probable location; and after the step of updating the geolocation cache database to indicate that the individual's portable computing device is at the first probable location and after the individual's portable computing device moves from a first location to a second location:

receiving information, at a second time, regarding a second current approximate location of the individual's portable computing device;

determining that the second current approximate location of the individual's portable computing device satisfies the second set of one or more criteria; and at least partially in response to determining that the second current approximate location of the individual's portable computing device satisfies the second set of one or more criteria, updating the geolocation cache database to indicate that the individual's portable computing device is at the second probable location; wherein:

the step of updating the particular data structure comprises, after updating the geolocation cache database to indicate that the individual's portable computing device is at the second probable location and while the individual is at the second location, updating the particular data structure to indicate that the individual's portable computing device is at the second location.

10. The computer-implemented method of claim 9, wherein the first location is a home of the individual and the second location is a workplace of the individual.

11. The computer-implemented method of claim 9, wherein the first location is a workplace of the individual and the second location is a home of the individual.

12. The computer-implemented method of claim 9, wherein:

the step of storing, in computer memory, first information regarding a first probable location of the individual when a location of the individual's portable computing device satisfies a first set of one or more criteria comprises:

storing, in computer memory, information indicating that, if an approximate location of the individual's portable computing device is within a predetermined distance of a first location, the individual's portable computing device is probably at the first location.

13. The computer-implemented method of claim 12, wherein:

the step of storing, in computer memory, second information regarding a second probable location of the individual when a location of the individual's portable computing device satisfies a second set of one or more criteria comprises:

storing, in computer memory, information indicating that, if an approximate location of the individual's portable computing device is within a predetermined distance of a second location, the individual's portable computing device is probably at the second location.

14. The computer-implemented method of claim 9, wherein the step of using one or more computing devices to continuously monitor a location of an individual's portable computing device comprises continuously using information from a plurality of different sources to determine the location of the individual's portable computing device.

15. The computer-implemented method of claim 14, wherein the step of using one or more computing devices to continuously monitor a location of an individual's portable computing device comprises continuously:

using information from a plurality of different sources to determine a plurality of potential current locations of the individual's portable computing device; and determining which of the plurality of potential current locations is the individual's probable current location.

16. The computer-implemented method of claim 15, wherein the step of determining which of the plurality of potential current locations is the individual's probable current location comprises:

determining whether the individual's portable computing device is currently in a first location or a second location; and the step of determining whether the individual's portable computing device is currently in a first location or a second location comprises:

determining a first number of sources of location information that indicate that the individual's portable computing device is at the first location;

determining a second number of sources of location information indicate that the individual's portable computing device is at the second location;

in response to the first number of sources being greater than the second number of sources, determining that the individual's portable computing device is currently at the first location; and in response to the second number of sources being greater than the first number of sources, determining that the individual's portable computing device is currently at the second location.

17. A computer-implemented method for initiating an emergency call to an emergency services provider for an individual who is in need of emergency assistance, and for providing an accurate, dispatchable location for the individual, to the emergency services provider, for use in dispatching emergency assistance to the individual, the method comprising, in response to receiving the request from a user to request initiation of the emergency call:

analyzing, in real time, current location data for the individual from a geolocation cache database, to determine a suitable current dispatchable location for the individual;

in response to determining the suitable current dispatchable location for the individual, updating an ALI database, in real time, to reflect that the individual's location is the determined current dispatchable location, the ALI database being an ALI database that a public-safety answering point that will handle an emergency call placed by the individual will access to determine the current location of the individual; and initiating the emergency call to the particular public-safety answering point, wherein:

the geolocation cache database stores current location data for the individual, the current location data comprising telemetry data from a portable communications device associated with the individual;

the geolocation cache database stores information regarding the MAC address of one or more networks that the portable computing device is in communication with;

the step of analyzing current location data for the individual comprises determining whether to ascertain the current dispatchable location based on the MAC address information or a location of the portable computing device that has been determined using triangulation techniques; and in response to determining to ascertain the current dispatchable location based on the MAC address information, ascertaining the current dispatchable location information based on the MAC address information.

18. A computer-implemented method for initiating an emergency call to an emergency services provider for an individual who is in need of emergency assistance, and for providing an accurate, dispatchable location for the individual, to the emergency services provider, for use in dispatching emergency assistance to the individual, the method comprising, in response to receiving the request from a user to request initiation of the emergency call:

analyzing, in real time, current location data for the individual from a geolocation cache database, to determine a suitable current dispatchable location for the individual;

in response to determining the suitable current dispatchable location for the individual, updating an ALI database, in real time, to reflect that the individual's location is the determined current dispatchable location, the ALI database being an ALI database that a public-safety answering point that will handle an emergency call placed by the individual will access to determine the current location of the individual; and initiating the emergency call to the particular public-safety answering point, wherein:

the geolocation cache database stores current location data for the individual, the current location data comprising telemetry data from a portable communications device associated with the individual;

the geolocation cache database stores information regarding the MAC address of one or more networks that the portable computing device is in communication with;

the step of analyzing current location data for the individual comprises determining whether to ascertain the current dispatchable location based on the MAC address information or a location of the individual that has been determined based on one or more social media postings associated with the individual; and in response to determining to ascertain the current dispatchable location based on the MAC address information, ascertaining the current dispatchable location information based on the MAC address information.

19. A computer-implemented method for initiating an emergency call to an emergency services provider for an individual who is in need of emergency assistance, and for providing an accurate, dispatchable location for the individual, to the emergency services provider, for use in dispatching emergency assistance to the individual, the method comprising, in response to receiving the request from a user to request initiation of the emergency call:

analyzing, in real time, current location data for the individual from a geolocation cache database, to determine a suitable current dispatchable location for the individual;

in response to determining the suitable current dispatchable location for the individual, updating an ALI database, in real time, to reflect that the individual's location is the determined current dispatchable location, the ALI database being an ALI database that a public-safety answering point that will handle an emergency call placed by the individual will access to determine the current location of the individual; and initiating the emergency call to the particular public-safety answering point, wherein:

the geolocation cache database stores current location data for the individual, the current location data comprising telemetry data from a portable communications device associated with the individual;

the geolocation cache database stores first location information regarding a location of the portable computing device that has been determined using triangulation techniques and second location information regarding a location of the portable computing device that has been determined using GPS technology;

the step of analyzing current location data for the individual comprises determining whether to ascertain the current dispatchable location based on the first location information or the second location information; and in response to determining to ascertain the current dispatchable location based on the second location information, ascertaining the current dispatchable location based on the second location information.

20. A computer-implemented method for initiating an emergency call to an emergency services provider for an individual who is in need of emergency assistance, and for providing an accurate, dispatchable location for the individual, to the emergency services provider, for use in dispatching emergency assistance to the individual, the method comprising, in response to receiving the request from a user to request initiation of the emergency call:
   analyzing, in real time, current location data for the individual from a geolocation cache database, to determine a suitable current dispatchable location for the individual;
   in response to determining the suitable current dispatchable location for the individual, updating an ALI database, in real time, to reflect that the individual's location is the determined current dispatchable location, the ALI database being an ALI database that a public-safety answering point that will handle an emergency call placed by the individual will access to determine the current location of the individual; and
   initiating the emergency call to the particular public-safety answering point, wherein:
      the computer system further receives information regarding a probable location of the particular individual when the individual's location satisfies one or more predetermined criteria; and
      the step of analyzing the current location data for the individual, from the geolocation cache database, to determine a suitable current dispatchable location for the individual comprises:
         (a) receiving information regarding an approximate location of the portable computing device;
         (b) determining whether the portable computing device's approximate location satisfies the one or more predetermined criteria; and
         (c) at least partially in response to determining that the portable computing device's approximate location satisfies the one or more predetermined criteria, determining the suitable current dispatchable location based on the received probable location of the particular individual.

21. The computer-implemented method of claim 20, wherein the step of determining whether the portable computing device's approximate location satisfies the one or more predetermined criteria comprises determining whether the portable computing device's approximate location is within a predetermined distance of the probable location.

* * * * *